May 11, 1937. H. G. KAMRATH 2,079,910
OIL FILTER
Filed Aug. 5, 1935 2 Sheets-Sheet 2

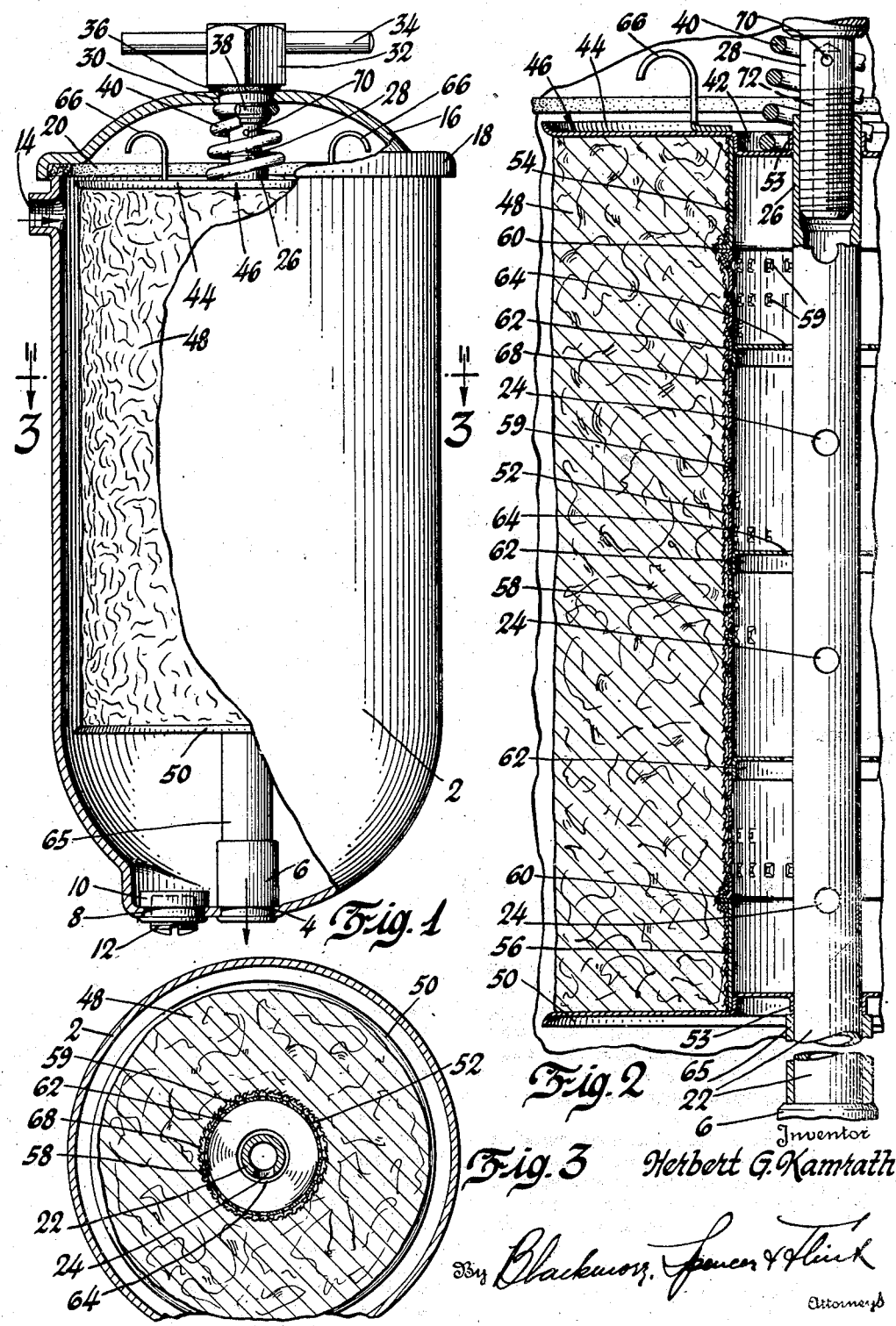

Inventor
Herbert G. Kamrath
By Blackmore, Spencer & Flint
Attorneys

Patented May 11, 1937

2,079,910

UNITED STATES PATENT OFFICE 2,079,910

OIL FILTER

Herbert G. Kamrath, Flint, Mich., assignor to General Motors Corporation, Detroit, Mich., a corporation of Delaware Application August 5, 1935, Serial No. 34,757

3 Claims. (Cl. 210—205)

This invention relates to filters and has particular reference to a novel filtering material for use on oil filters.

The novel filtering element of the invention comprises the use of blast furnace slag in the form of mineral wool or rock wool made from natural rock such as limestone. Filters of various kinds which make use of mineral wool as a filtering material are very old and well known, but in the prior art the use of this material has always been in the state in which it has been blown, that is, in the fibrous or woolly state. It has been found that while this material gives satisfactory filtration, there is some objection to its use in that it is always necessary to use an outer covering or retainer to hold the wool in place. If this outer retaining covering is not used, the filtering material will not hold its shape and will fall to the bottom of the filter or receptacle in which it is held. There is also the tendency to float in the filtering liquid and the danger of passing small particles of the slag wool or mineral wool into the filtered liquid. Additionally, there is the objection that when the filters are being made the light fibers of the mineral wool will float in the air and thus injure the health of the workmen.

In accordance with the invention the rock wool or mineral wool is mixed with a suitable binder, such as a solution of silicate of soda or ordinary clay and water, until the mixture is in a mushy state. A quantity of the mixture is then suitably formed to adapt it to a filter and the liquid of the binder driven from the mixture by drying, such as heating in an oven. After the liquid has been driven from the mass, the resultant product is a hard porous mass of mineral wool which is capable of maintaining its own shape and needs no outer retaining element. The mass is sufficiently porous to give good filtering and is not likely to "channel". By "channeling" is meant the tendency to form definite passages through the slag wool which will allow unfiltered liquid to pass directly through the filter without being properly filtered.

On the drawings:

Figure 1 is a view in elevation of a filter in accordance with the invention, parts being broken away and shown in section to illustrate the construction.

Figure 2 is an enlarged sectional view through the filter cartridge or element of the invention.

Figure 3 is a section on the line 3—3 of Figure 1.

Figure 4:
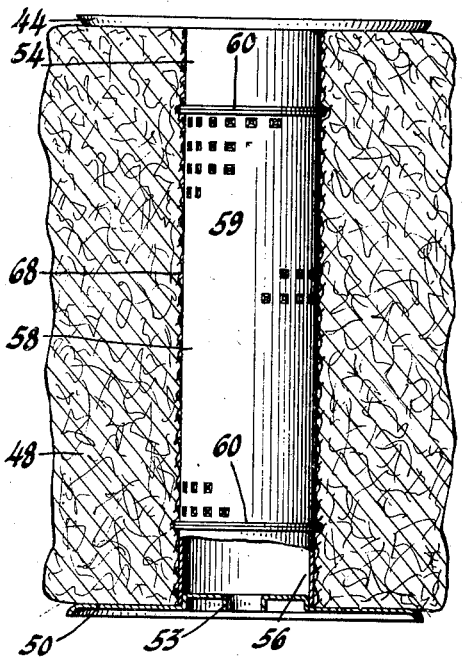
Figure 4 is a view of the filter before the compression of the filtering material.

Referring to the drawings, the numeral 2 indicates a container of any suitable kind. The container has the bottom opening 4 in which there is fastened the outlet fitting 6, the fitting having a passage therethrough to allow the exit of the filtered oil. A second opening 8 in the bottom of the container 2 has the fitting 10 secured therein. The fitting 10 is internally threaded and receives the drain plug 12. By unscrewing the plug 12 the filter may be drained. The filter has the inlet opening 14 below the upper edge thereof.

The cover of the filter is indicated at 16. A flange 18 on the filter cover fits over the upper end of the container and a gasket 20 is applied between the cover and the container to form a liquid tight joint.

Inside the container the central outlet tube 22 is rigidly secured at its lower end in the outlet fitting 6. The tube has the openings 24 therein to allow the filtered oil to enter the tube on its way to the outlet fitting 6. The upper end 26 of the tube is internally threaded to receive the threaded shank of the fitting 28 which extends through an opening 30 in the cover 16 and is formed to a polygonal head 32 at its upper end. The polygonal head has a handle 34 passing therethrough to enable the fitting 28 to be turned into the threaded end 26 of the tube 22. A suitable gasket 36 is used between the head 32 and the top of the cover 16 to form a liquid tight connection.

On the inside of the container the fitting 28 is provided with a groove 38 in which there is received one end of a coil spring 40, the other end of which rests in an annular recess 42 on one of the end members 44 of a spool or bobbin shaped element 46 which receives the filtering material 48.

The function of the spring 40 is to hold the parts from rattling when in operative position. By turning the handle 34 the upper fitting 28 will be screwed into the threaded end 26 which will compress the coil spring 40 and the gaskets 20 and 36 to form a liquid tight connection. A second end member 50, similar in shape to the end member 44, is used, and the two are connected by the central cylinder 52. The end members 44 and 50 have central openings to enable them to be passed over the tube 22, and flanges 53 are provided at the openings. The cylinder 52 comprises the upper imperforate end member 54, the lower imperforate end member 56, and the intermediate perforate member 58. These three members are suitably secured together as by welding at the flanges 60. The perforate member 58 is provided with the openings 59 entirely around its periphery. Suitable spacers or reinforcing members 62 are secured to the interior of the perforate member and have central openings 64 to allow the spool or bobbin shaped element 46 to be passed over the outlet tube 22.

At the lower end of the filter a spacing tube 65 spaces the lower end member 50 from the outlet fitting 6. The spacer 65 passes freely over the tube 22.

Suitable handles 66 are secured to the end member 44 to allow for an easy insertion or removal of the filtering spool 46.

A suitable fabric 68 such as wool felt or canton flannel is applied around the cylindrical element 52 before the application of the filtering material 48. The purpose of the fabric is to prevent the entrance of any of the filtering medium into the cylinder 58.

The filterng element 48 of the invention comprises either rock wool or natural blast furnace slag known commercially as mineral or slag wool. This wool is not used on the spool or cartridge as the wool comes from the manufacturer. In its manufactured state it is fibrous or stringy and quite brittle, the fibers tending to break and fall to the bottom of whatever receptacle contains them. In order to retain them on a bobbin or spool such as shown in the figure it is necessary to surround the mineral wool with a covering of a fabric such as canton flannel or a wire screen. This fabric or screen is necessary to retain the filtering medium in its shape.

Figure 5:
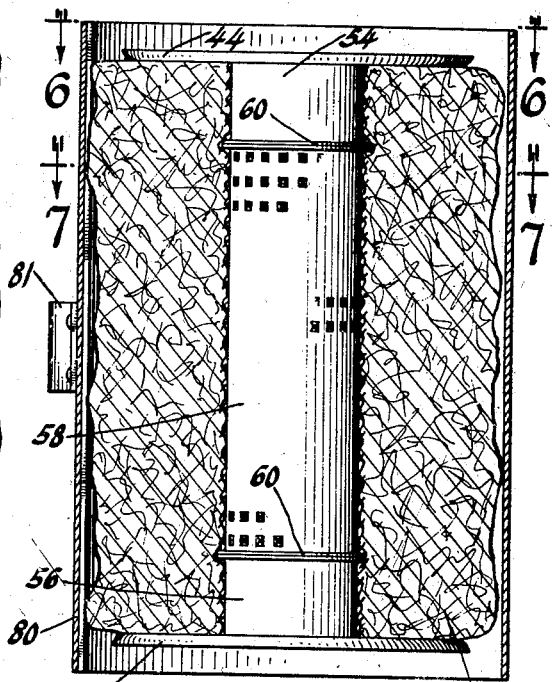
Figure 5 is a view similar to Figure 4 but with the shaper applied.
Figure 6:
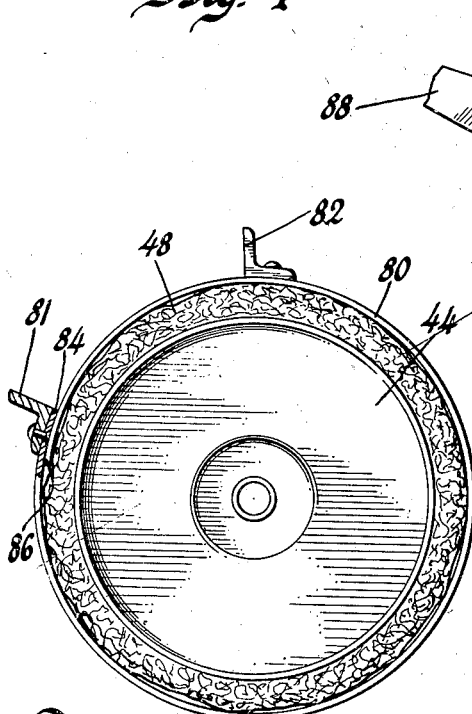
Figure 6 is a sectional view substantially on the line 6—6 of Figure 5.
Figure 7:
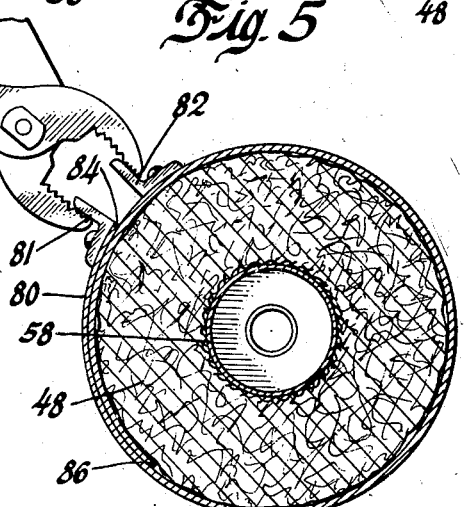
Figure 7 is a sectional view substantially on the line 7—7 of Figure 5, but showing the filtering material compressed.

In the present instance the wool is first made into a mushy state by mixing it with a suitable binder, for instance a thin solution of silicate of soda. After the mineral wool and binder are thoroughly mixed and in the mushy state a weighed quantity is suitably applied such as by hand to the bobbin or spool 46 until the spool is substantially filled as shown in Figure 4. A shaper or former 80 in the form of a cylindrical yieldable or flexible metal band is then placed around the spool and wool as shown in Figures 5 and 6. The shaper 80 has two lugs 81 and 82 secured thereto for the application of a suitable tool. In Figure 6 it will be noted that the ends 84 and 86 of the shaper 80 overlap. By applying a suitable tool 88, such as a pair of pincers, to the lugs 81 and 82 in Figure 6, the end 84 may be drawn toward the lug 82 to compress the wool from the mushy state of Figures 4-6 to the compacted state as is shown in Figures 1-3 and 7. When the pincers are released, the shaper 80 will expand because of its inherent spring action, thereby enabling the shaper easily to be removed. The wool will retain its compressed state. The filtering cartridge in some cases is then placed in an oven and baked until the liquid of the binder is driven off. Certain clay binders having natural setting property may require little or no heating. The resulting filter element is a hard porous mass of wool which will retain its own shape without the aid of an exterior covering and is sufficiently porous to give very good filtering service. The binder and the shape and form of the filtering mass will not deteriorate while the filter is in use, but the mass will retain its shape throughout the life of the filter.

Experiment has determined that the addition of the binder and the baking to drive off the liquid does not decrease the filtering ability of the mineral wool or rock wool. The making of the filtering element into the hard porous state will prevent "channeling" of the filtering material whereby a better filtering results.

If desired, to neutralize any acidic condition in the oil to be filtered some trisodium phosphate or other alkaline material may be added to the binder during the mixing operation. However, as some forms of wool are already basic in character, it has been found that it is ordinarily not necessary to add any material to neutralize the acid in the oil.

In operation, assuming the filter is assembled as shown in Figure 1, the oil or other liquid to be filtered will enter at 14 and pass through the filtering material 48, then through the perforations 59 in the central element 58, then through the openings 24 in the outlet tube, and then to the outlet fitting 6. If for any reason the filter should be plugged and oil cannot pass through the filtering element, a small relief or bypass opening 70 is provided in the fitting 28. This opening connects with a bore 72 in the fitting, the bore connecting with the interior of the tube 22. The opening 70 will at all times allow a quantity of unfiltered oil to pass through the filter and will prevent the starving of the apparatus to be lubricated due to the filter being plugged.

I claim:

1. A cylindrical filtering element comprising a hard porous mass of mineral wool mixed with silicate of soda.

2. In a filtering element, a shaped form to receive the element, said form comprising end disks connected by a hollow perforated column, a fabric surrounding the column, and a filtering element comprising a hard porous mass of mineral wool mixed with silicate of soda surrounding the space around the column and between the disks.

3. A filtering material comprising a hard porous mass of untreated mineral wool mixed with a silicate of soda binder.

HERBERT G. KAMRATH.